United States Patent [19]

Tanaka et al.

[11] Patent Number: 5,751,353
[45] Date of Patent: May 12, 1998

[54] SWITCHING APPARATUS FOR TV LENS UNIT SWITCHING

[75] Inventors: Minoru Tanaka; Shigeru Yamamoto; Yoshitaka Mori, all of Omiya, Japan

[73] Assignee: Fuji Photo Optical Co., Ltd., Omiya, Japan

[21] Appl. No.: 570,607

[22] Filed: Dec. 11, 1995

[30] Foreign Application Priority Data

Dec. 16, 1994 [JP] Japan .................................. 6-334326
Dec. 16, 1994 [JP] Japan .................................. 6-334327

[51] Int. Cl.$^6$ ............................................ H04N 5/225
[52] U.S. Cl. ...................... 348/335; 348/358; 396/73
[58] Field of Search ............................ 348/335, 358, 348/360; 396/71, 72, 73, 74, 75; H04N 5/225

[56] References Cited

U.S. PATENT DOCUMENTS 4,757,335 7/1988 Muryoi et al. ............................. 396/73
4,887,107 12/1989 Nakamura et al. ....................... 396/73
5,444,485 8/1995 Uchioke et al. .......................... 348/335

Primary Examiner—Wendy Garber
Attorney, Agent, or Firm—Ronald R. Snider

[57] ABSTRACT

A small and light TV camera extender switching apparatus which is capable of switching two extenders having different magnifications. A first extender and a second extender are supported by the same support shaft so as to be rotatable independently of each other. The first extender and the second extender are rotated by operating the first operating lever and the second operating lever, respectively, via gear trains, so that either extender is moved from the resting position outside of an imaging optical path to a working position in the imaging optical path. A stopper mechanism which is capable of adjusting a retaining position is disposed on the lens frame or in the case so as to adjust the retaining positions of each extender at the resting position and the working position.

7 Claims, 5 Drawing Sheets

SWITCHING APPARATUS FOR TV LENS UNIT SWITCHING

BACKGROUND OF THE INVENTION

This application claims the priority of Japanese Patent Application Nos. 6-334326 and 6-334327 filed on Dec. 16, 1994.

1. Field of the Invention

The present invention relates to a switching apparatus for switching two extenders having different magnifications which are used for a TV camera or the like.

2. Description of the Related Art

An extender used for a television camera is composed of a variable power lens (extender lens) which is removably disposed in an imaging optical path of a lens system and which is inserted, if necessary, so as to change an image size. For example, if an extender lens of 2 magnifications is disposed in the imaging optical path by operating an external operating lever, it is possible to double the image size.

In a conventional TV camera or the like, since only one extender is disposed, it is impossible to use extenders having different magnifications by switching. The present applicator proposes a TV camera having two switchable extenders. However, this brings about the following problems.

The case of mounting two extenders on a turret will first be considered. The structure of the turret is shown in FIG. 8. A case 2 of an extender portion is disposed at the position shown in FIG. 8 relative to an imaging optical path 1, and a turret 4 which rotates around a support shaft 3 is provided in the case 2. A circular opening 5 and lens systems 6, 7 having different magnifications are disposed on the turret 4.

According to this structure, by rotating the turret 4, it is possible to dispose the opening 5 in the imaging optical path when no extender is used, and selectively use the expenders 6, 7 having different magnifications by switching. However, in such an extender switching structure of a turret type, a large extender portion is necessary and the weight thereof is heavy. In addition, the mechanism of rotating a turret and stopping it at a predetermined position is complicated.

Alternatively, two extenders supported by the respective shafts may be withdrawably provided in an imaging optical path. In this case, however, since two extenders are supported by the two shafts, the extender portion becomes also large and heavy.

SUMMARY OF THE INVENTION

Accordingly, it is an object of the present invention to eliminate the above-described problems in the related art and to provide an extender switching apparatus which is capable of switching two extenders having different magnifications by using a small and light extender portion.

To achieve this end, a TV camera extender switching apparatus according to the present invention comprises: at least two extenders having different magnifications which are supported so as to be rotatable independently of each other and selectively movable from respective resting positions outside of an imaging optical path to a working position in the imaging optical path; and operating levers for respectively rotating the two extenders via gears. The plurality of extenders are preferably supported by the same support shaft.

According to this structure, the two extenders having different magnifications are supported by the support shaft, and by rotating the operating lever, either of the extenders is moved from the resting position to the working position in the imaging optical path. Since the two extenders are supported by the same support shaft, a compact extender portion is realized.

It is preferable that a stopper mechanism for positioning one extender, which is moved to the working position, by the lens frame of the other extender is provided between the lens frames. The stopper mechanism is preferably capable of adjusting the retaining position.

At the resting position and the working position, the two extenders are retained by the stopper mechanism disposed on the lens frame, thereby avoiding the collision of the extenders. Since the stopper mechanism adjusts the stopper position, it is possible to accurately set the retaining position of each extender.

A damper mechanism for making the rotating and stopping operations smooth may be provided at the rotating portions of the first and second extenders.

It is also preferable to provide a position detector on the lens frame of each extender.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
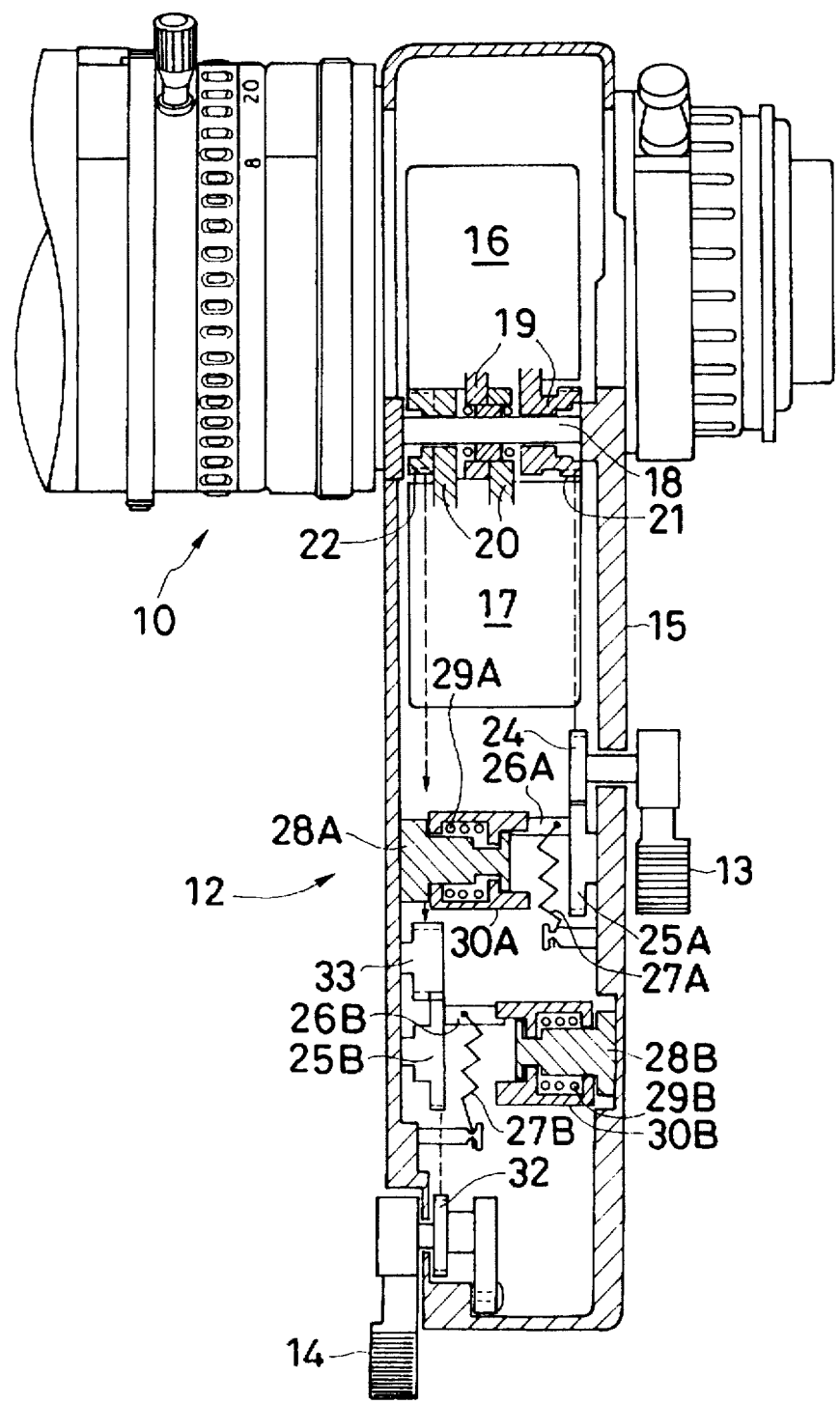
FIG. 1 is a development sectional view of the structure of a first embodiment of a TV camera extender switching apparatus according to the present invention.
Figure 2:
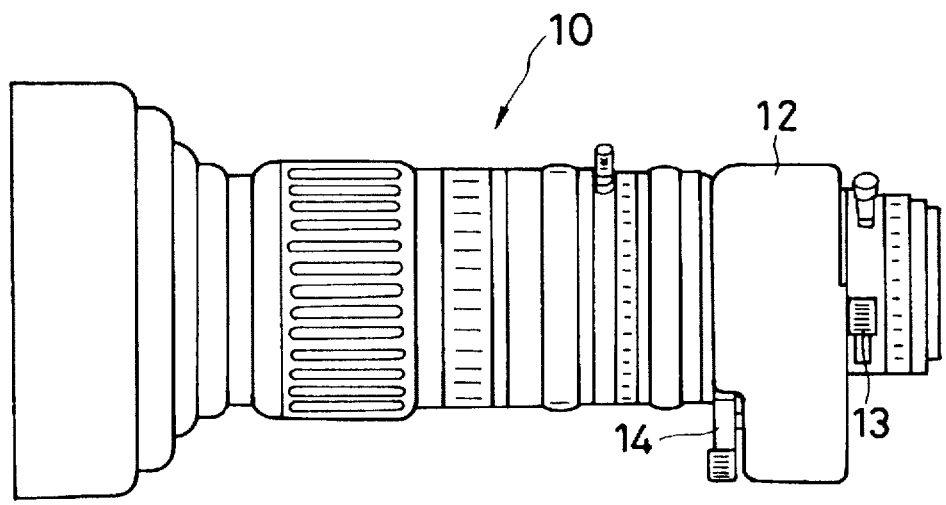
FIG. 2 is a side elevational view of the entire structure of the lens portion in the first embodiment shown in FIG. 1.
Figure 3:
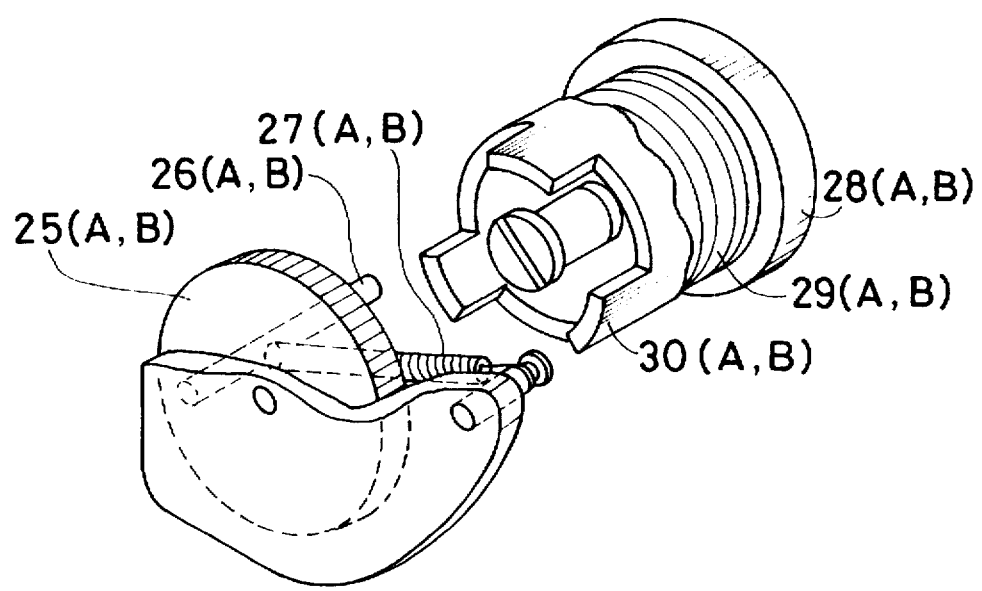
FIG. 3 is a perspective view of the structure of a damper mechanism in the first embodiment shown in FIG. 1.
Figure 4:
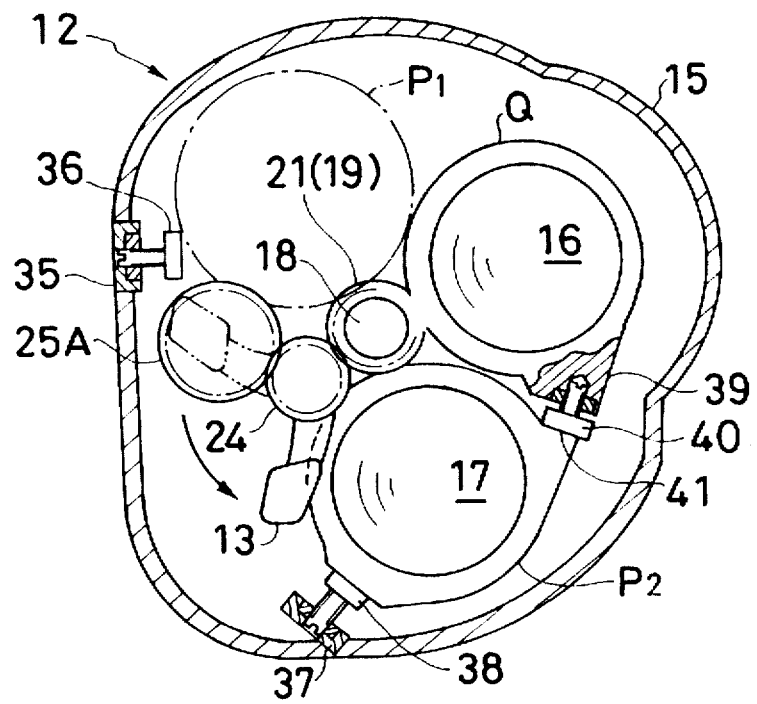
FIG. 4 is a back view of the extender portion in the first embodiment, explaining the state operated by a first operating lever.
Figure 5:
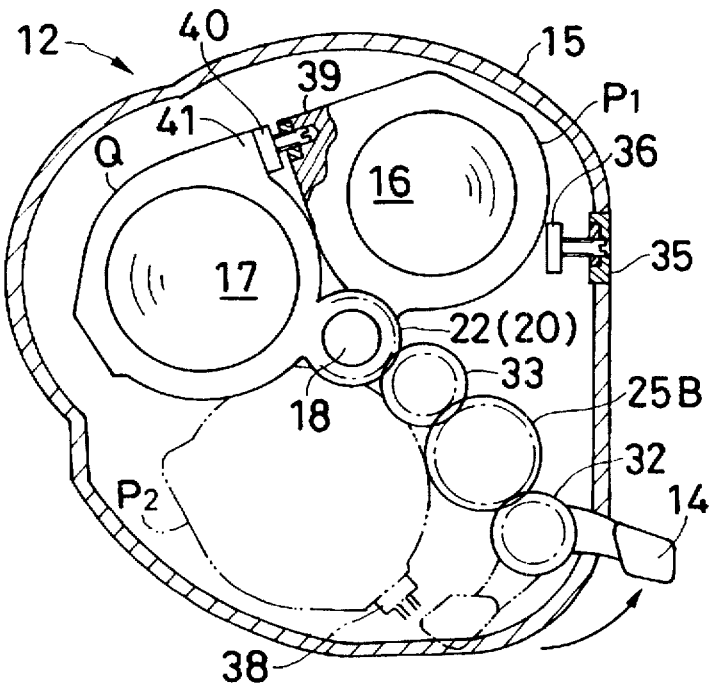
FIG. 5 is a front view of the extender portion in the first embodiment, explaining the state operated by a second operating lever.

FIGS. 1 to 5 show the structure of a first embodiment of an extender switching apparatus according to the present invention, wherein FIG. 1 is a development of an extender portion, FIG. 2 shows the entire structure of a lens portion, FIG. 3 is a perspective view of a damper mechanism, FIG. 4 is a back view of an extender portion, and FIG. 5 is a front view thereof. In FIG. 2, a focus lens system for focusing and a zoom lens system for varying the magnification are provided in a lens portion 10, and an extender portion 12 is provided behind the lens portion 10. A first operating lever 13 and a second operating lever 14 are disposed on the front side and back side, respectively, of the extender portion 12.

As shown in FIG. 1, the extender portion 12 has a case body 15, and a first extender 16 of 2 magnifications, for example, and a second extender 17 of 2.5 magnifications are disposed in the extender portion 12. Each extender is composed of a plurality of lenses, and the magnification is arbitrary. These extenders 16, 17 have holding rings 19, 20, respectively, for attaching the extenders 16, 17 to a support shaft 18, on the respective lens frames, and the holding rings 19, 20 are alternately arranged on the support shaft so as to freely rotate the first and second extenders 16, 17. The holding rings 19, 20 are integrally provided with gears 21, 22.

A gear 24 is integrally provided with the first operating lever 13 so as to mesh the gear 21 of the holding ring 19. It is therefore possible to rotate the first extender 16 by operating the first operating lever 13. The gear 24 is connected to a gear 25 within a damper mechanism which prevents the noise and vibration caused at the time of collision. The damper mechanism in the first embodiment is composed of a gear 25A with a pin 26A implanted therein, a spring 27A and an engaging member 30A disposed on a supporting portion 28A via a compression spring 29A.

A second operating lever 14 is disposed on the opposite side of the first operating lever 13, and a gear 32 integrally provided with the second operating lever 14 is connected to a gear 33 via a gear 25B within the damper mechanism. The gear 33 is disposed so as to mesh the gear 22 of the holding ring 20. It is therefore possible to rotate the second extender 17 by operating the second operating lever 14. The damper mechanism is composed of a gear 25B with a pin 26B implanted therein, a spring 27B and an engaging member 30B disposed on a supporting portion 28B via a compression spring 29B.

As shown in FIGS. 4 and 5, a stopper which is capable of adjusting a retaining position is provided in the first embodiment. The positions P1, P2 are resting positions of the extenders 16, 17, and the position Q is a working position in the imaging optical path. In order to retain the first extender 16 at the resting position P1, a stopper 36 which is screwed to a fixing portion 35 of a case body 15 is provided, and in order to retain the second extender 17 at the resting position P2, a stopper 38 which is screwed to a fixing portion 37 of the case body 15 is provided. It is possible to adjust the retaining position by varying the amount of screwing of the screwing portion (the height of the stopper 36 (38) from the fixing portion 35 (37), thereby accurately positioning the extender 16 (17).

Accordingly, by adjusting the stopper 38, the first extender 16 can be disposed in a predetermined imaging optical path at the working position Q via the second extender 17, and by adjusting the stopper 36, the second extender 17 can be disposed in a predetermined imaging optical path via the first extender 16. A fixing portion 39 having a screwing portion is formed on the lens frame of the first extender 16, and a stopper 40 is attached to the fixing portion 39. A contacting portion 41 for receiving the head portion of the stopper 40 is formed on the lens frame of the second extender 17. The stopper 40 serves to prevent a direct collision of the extenders 16, 17. The stopper 40 may have a fixed shape without a screwing portion.

In this embodiment, the stopper 40 have a screwing portion which enables the retaining portion to be adjusted by varying the amount of screwing of the screwing portion, so that positioning at the working position Q is possible. The positioning of the extenders 16, 17 at the working position is basically conducted by the stoppers 36, 38, but it may be conducted by the stopper 40. In other words, the stoppers 36, 38 may not be unable to adjust the retaining positions, and the extenders 16, 17 may be positioned by the stopper 40. It is also possible to form the stopper 40 on the lens frame of the second extender 17 and form the contacting portion on the lens frame of the first extender 16.

Figure 6:
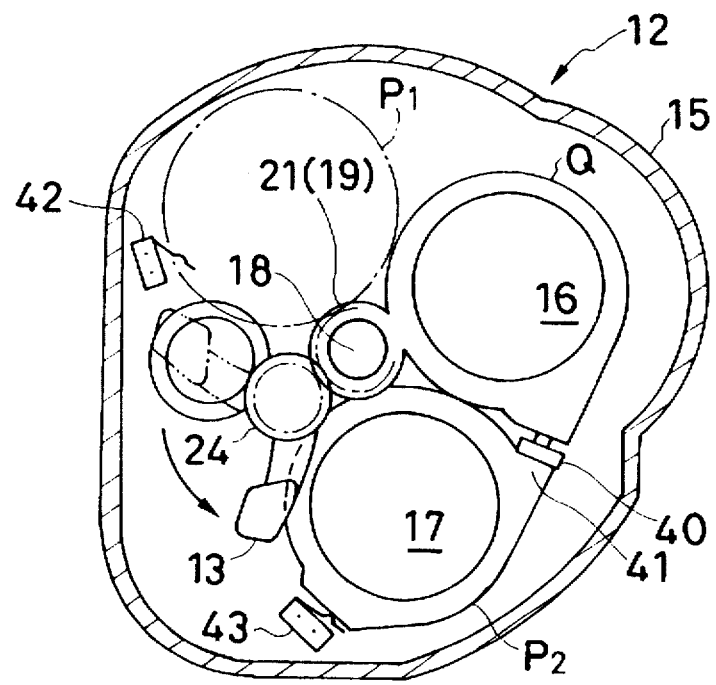
FIG. 6 shows position detectors arranged in the extender portion.

In this embodiment, microswitches 42, 43 as position detectors are provided in the vicinity of the stoppers 36, 38, as shown in FIG. 6. The microswitch 42 detects that the first extender 16 is at the resting position P1 and the microswitch 43 detects that the second extender 17 is at the resting position P2.

The operation of the first embodiment having the above-described structure will be explained. When the first extender 16 is used, the first operating lever 13 is rotated counterclockwise from the position indicated by the broken line to the position indicated by the solid line in FIG. 4. The gear 24 of the first operating lever 13 meshes the gear 21 of the ring 19, so that the first extender 16 moves from the resting position P1 to the working position Q. At this time, the damper mechanism shown in FIGS. 1 and 3 works. The pin 26A provided in the gear 25A is biased by the spring 27A in both rotating directions from the dead point. The dead point is set at the middle of the resting position P1 and the working position Q.

If the first operating lever 13 is rotated until the position which exceeds half of the region, the first extender 16 is moved to the working position Q by the urging force of the spring 27A (the operation for returning the first extender 16 to the resting position P1 is the same). When the pin 26A passes the dead point, the pin 26A engages the forward end portion of the engaging member 30A. Since the engaging member 30A is pressed by the flange-shaped head portion of the supporting portion 28, the frictional force acts on the urging force of the spring 27A. As a result, the first extender 16 is smoothly moved free from the noise and vibration caused at the time of collision.

The first extender 16 hits against the contacting portion 41 of the stopper 40 and is therefore retained. That is, the stopper 40 prevents a direct collision of the extenders 16, 17. In this manner, in this embodiment, by providing the stopper mechanisms on the lens frames of the extenders 16, 17, the structure of arranging the two extenders 16, 17 is further simplified. The positioning of the first extender 16 at the working position Q is conducted by the stoppers 38 provided at the resting position P2 and the stopper mechanism of the fixing portion 37, which enables accurate positioning.

When the second extender 17 is used, the second operating lever 14 is rotated counterclockwise from the position indicated by the broken line to the position indicated by the solid line in FIG. 5. The gear 32 of the second operating lever 14 meshes the gear 22 via the gear 25B and the gear 33, so that the second extender 17 moves from the resting position P2 to the working position Q (the first extender 16 simultaneously moves to the resting position P1). At this time, owing to the damper mechanism (25B to 30B), the second extender 17 smoothly moves free from the noise and vibration caused at the time of collision. In addition, owing to the stopper 36 provided at the resting position P1 and the stopper mechanism of the fixing portion 35, the second extender 17 is accurately moved to the working position Q. The accurate positioning is realized by adjusting the height of the stoppers 36, 38 from the fixing portions, or the height of the stopper 40 from the fixing portion 39.

When the extenders 16, 17 are retained by the stopper mechanisms, the microswitches 42, 43 detect the positions and the operating state of the extenders 16, 17. According to this embodiment, since it is not necessary to dispose a stopper mechanism or a position detector used for moving the extender to the working position Q on the case body 15 or the like, a small and light extender portion is realized.

Figure 7:
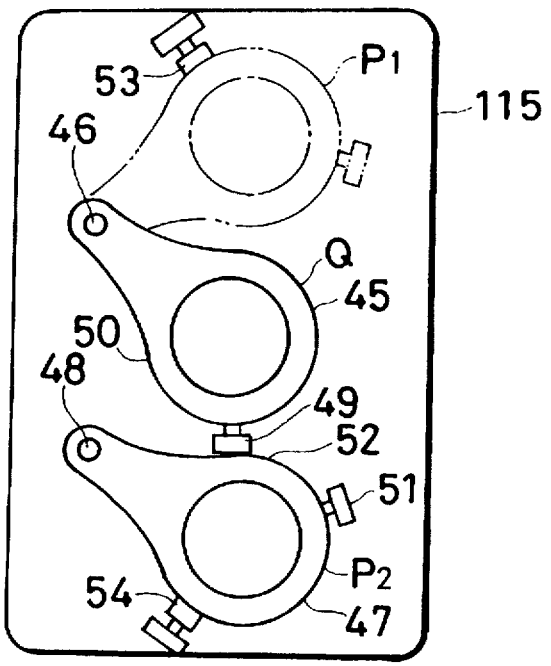
FIG. 7 shows the structure of a second embodiment of the present invention.
Figure 8:
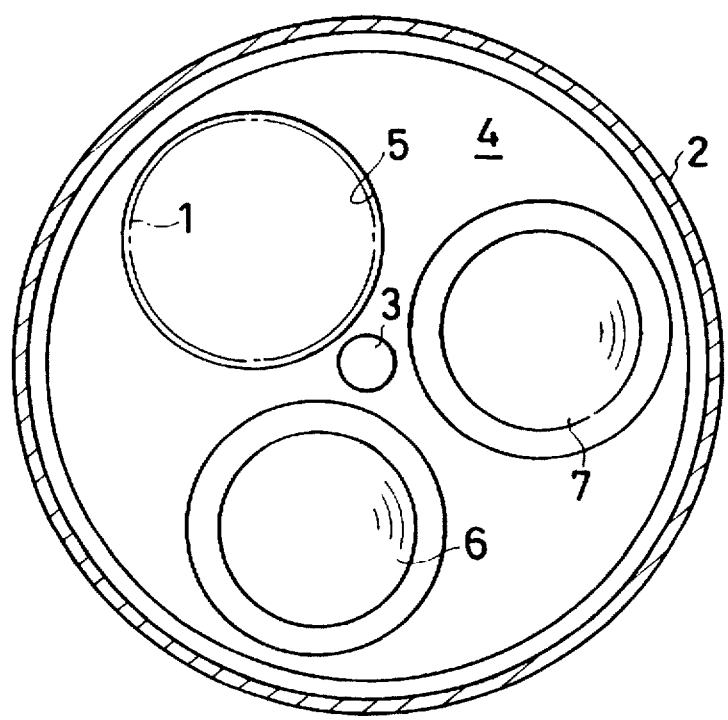
FIG. 8 shows the structure of an extender switching apparatus of a turret type.

FIG. 7 shows the structure of a second embodiment. In this embodiment, two extenders are supported by the respective shafts. In an extender portion 115, a first extender 45 is supported by a support shaft 46, and a second extender 47 is supported by a support shaft 48. The first extender 45 is provided with a stopper 49 which is capable of adjusting a retaining position and a contacting portion 50, and the second extender 47 is provided with a stopper 51 which is capable of adjusting a retaining position and a contacting portion 52. Similar stoppers 53, 54 are disposed at the resting positions P1 and P2, and microswitches are disposed in the vicinity of the stoppers 53, 54.

As described above, according to the present invention, it is possible to switch two extenders having different magnifications, and to produce a small, compact and light extender portion by an improvement of the arrangement and the structure of members such as stopper mechanisms.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A Switching Apparatus for TV magnification Lens Switching comprising:

at least two lens units having different magnifications which are supported so as to be rotatable independently of each other and selectively movable from respective resting positions outside of an imaging optical path to a working position in said imaging optical path; and operating levers for respectively rotating said lens units via gears.

2. A Switching Apparatus for TV magnification Lens Switching according to claim 1, wherein said at least two lens units are supported by the same support shaft.

3. A Switching Apparatus for TV magnification Lens Switching according to claim 1, further comprising a stopper mechanism between two lens frames for positioning one lens unit when moved to said working position, by movement of a lens frame of another lens unit.

4. A Switching Apparatus for TV magnification Lens Switching according to claim 1, further comprising a damper mechanism provided at the rotating portion of each of said lens units so as to make the rotating and stopping operations of each lens unit smooth.

5. A Switching Apparatus for TV magnification Lens Switching according to claim 1, further comprising a position detector provided on the lens frame of each of said lens units.

6. A Switching Apparatus for TV magnification Lens Switching comprising:

a first lens unit which is supported by one support shaft so as to be rotatable from a resting position outside of an imaging optical path to t working position in said imaging optical path;

a second lens unit which is supported by said one support shaft so as to be rotatable from a resting position outside of said imaging optical path and opposite to said resting position of said first lens unit with said working position therebetween to said working position in an approximate same manner as said first lens unit, and which has a different magnification from the magnification of said first lens unit;

a case body for accommodating said first lens unit and said second lens unit;

a first operating lever disposed on either of the front surface and the back surface of said case body so as to rotate said first lens unit via a gear;

a second operating lever disposed on the other of the front surface and the back surface of said case body so as to rotate said second lens unit via a gear; and a stopper mechanism disposed between the lens frames of said two lens units so as to position one of said first lens unit and said second lens unit by the other lens unit when said one lens unit moves to said working position.

7. A Switching Apparatus for TV magnification Lens Switching according to claim 3, wherein said stopper mechanism is capable of adjusting the retaining position.

* * * * *